(12) United States Patent
Garcia et al.

(10) Patent No.: US 9,616,513 B2
(45) Date of Patent: Apr. 11, 2017

(54) METHODS FOR JOINING TWO BLANKS AND BLANKS AND PRODUCTS OBTAINED

(71) Applicant: AUTOTECH ENGINEERING A.I.E., Amorebieta-Etxano (ES)

(72) Inventors: Michel Garcia, Sitges (ES); Cristina Carrascosa García, Barcelona (ES); Elisenda Vila I Ferrer, Barcelona (ES)

(73) Assignee: AUTOTECH ENGINEERING A.I.E., Amorebieta-Etxano (ES)

( * ) Notice: Subject to any disclaimer, the term of this patent is extended or adjusted under 35 U.S.C. 154(b) by 0 days.

(21) Appl. No.: 14/782,732

(22) PCT Filed: Dec. 11, 2014

(86) PCT No.: PCT/EP2014/077463
§ 371 (c)(1),
(2) Date: Oct. 6, 2015

(87) PCT Pub. No.: WO2015/086781
PCT Pub. Date: Jun. 18, 2015

(65) Prior Publication Data
US 2016/0045970 A1 Feb. 18, 2016

(30) Foreign Application Priority Data
Dec. 12, 2013 (EP) ..................... 13382506

(51) Int. Cl.
*B23K 1/005* (2006.01)
*B23K 26/322* (2014.01)
(Continued)

(52) U.S. Cl.
CPC ........ *B23K 1/0056* (2013.01); *B23K 26/0081* (2013.01); *B23K 26/144* (2015.10);
(Continued)

(58) Field of Classification Search
None
See application file for complete search history.

(56) References Cited

U.S. PATENT DOCUMENTS 5,828,032 A * 10/1998 Krzys ................. B23K 15/006
219/121.64
8,604,382 B2 12/2013 Yano et al.
(Continued)

FOREIGN PATENT DOCUMENTS

CN 102066040 A 5/2011
CN 102985215 A 3/2013
(Continued)

OTHER PUBLICATIONS

International Search Report for PCT/EP2014/077463, mailed Apr. 13, 2015, 9 pgs.

*Primary Examiner* — David Angwin
*Assistant Examiner* — John J Norton
(74) *Attorney, Agent, or Firm* — Squire Patton Boggs (US) LLP

(57) ABSTRACT

Methods for joining a first blank and a second blank are disclosed, wherein at least one of the first and second blanks comprising at least a layer of aluminum or of an aluminum alloy. Methods may comprise selecting a first portion of the first blank to be joined to the second blank, and selecting a second portion of the second blank to be joined to the first portion; welding the first portion to the second portion, while supplying a metal powder to a weld zone, wherein the first portion and the second portion of the blanks and the metal powder in the weld zone are melted during welding and the metal powder is mixed with the melted first and second portions, and wherein the metal powder is an iron based powder comprising gammagenic elements. The disclosure further relates to blanks and products obtained using such methods.

12 Claims, 4 Drawing Sheets

(51) Int. Cl.
    *B23K 26/352* (2014.01)
    *B23K 26/211* (2014.01)
    *B23K 35/32* (2006.01)
    *B23K 26/144* (2014.01)
    *B23K 35/30* (2006.01)
    *B23K 26/00* (2014.01)
    *B23K 35/38* (2006.01)
    *B23K 35/02* (2006.01)
    *B23K 101/34* (2006.01)

(52) U.S. Cl.
    CPC .......... B23K 26/211 (2015.10); B23K 26/322 (2013.01); B23K 35/0244 (2013.01); B23K 35/0255 (2013.01); B23K 35/30 (2013.01); B23K 35/308 (2013.01); B23K 35/3053 (2013.01); B23K 35/3066 (2013.01); B23K 35/38 (2013.01); B23K 35/383 (2013.01); *B23K 2201/34* (2013.01)

(56) References Cited

U.S. PATENT DOCUMENTS

| | | | |
|---|---|---|---|
| 9,321,132 B2 | 4/2016 | Briand et al. | |
| 2002/0017509 A1* | 2/2002 | Ishide | B23K 26/0604 219/121.63 |
| 2003/0121895 A1* | 7/2003 | Sonoda | B23K 26/0608 219/121.63 |
| 2008/0128053 A1* | 6/2008 | Jansen | B23K 26/24 148/400 |
| 2008/0257870 A1* | 10/2008 | Longfield | B23K 1/0056 219/121.64 |
| 2013/0078031 A1* | 3/2013 | Nakamura | B23K 26/1429 403/272 |
| 2013/0098878 A1* | 4/2013 | Briand | B23K 35/0261 219/74 |
| 2014/0003860 A1* | 1/2014 | Evangelista | B23K 26/3293 403/270 |
| 2014/0231395 A1* | 8/2014 | Brandt | B23K 26/26 219/74 |

FOREIGN PATENT DOCUMENTS

| | | |
|---|---|---|
| DE | 202007018832 U1 | 9/2009 |
| EP | 1179382 A2 | 2/2002 |
| EP | 2567776 A1 | 3/2013 |
| JP | H03-110097 A | 5/1991 |
| JP | H06328280 | 11/1994 |
| JP | 2010167435 A | 8/2010 |
| JP | 5248347 B2 | 7/2013 |
| JP | 2013533807 A | 8/2013 |
| KR | 10-2011-0020847 A | 3/2011 |
| WO | WO 2012/007664 A1 | 1/2012 |
| WO | WO 2013/045497 | 4/2013 |

* cited by examiner

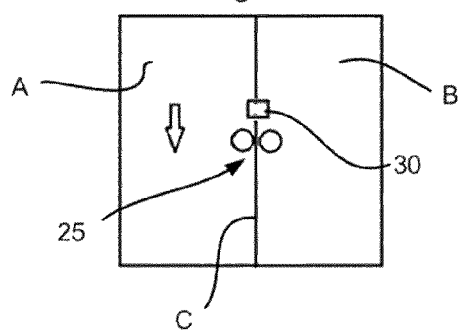
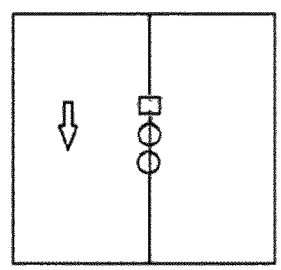
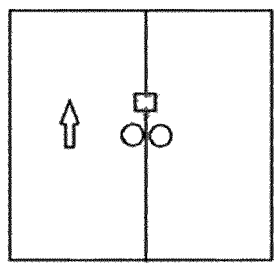
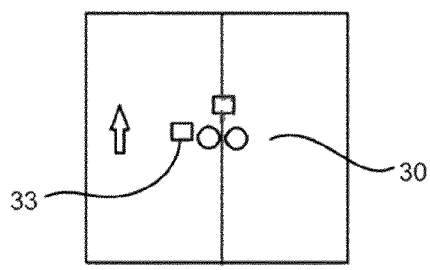

METHODS FOR JOINING TWO BLANKS AND BLANKS AND PRODUCTS OBTAINED

This application claims the benefit of European Patent Application EP13382506.7 filed on Dec. 12, 2013.

The present disclosure relates to methods for joining two blanks, and methods for obtaining products after joining two blanks. The present disclosure further relates to products obtained by or obtainable by any of these methods.

BACKGROUND

The development of new materials and processes for the production of metal pieces with the aim of reducing component weight at a low cost is of utmost importance in the automotive industry. In order to achieve these objectives, the industry has developed ultra-high-strength steels (UHSS) which exhibit an optimized maximal strength per weight unit and advantageous formability properties. These steels are designed to attain a microstructure after heat treatment, which confers good mechanical properties and makes them especially suited for the hot stamping process used to form steel blanks into particular automobile parts. Since during the hot stamping process the blank is subjected to aggressive atmospheres, the steel is usually coated to avoid corrosion and oxidation.

In an attempt to minimize the weight of components while respecting structural requirements, so-called "tailored blank" techniques may be used. In these techniques, components may be made of a composite metal blank which is obtained by welding several blanks with different thicknesses, size and properties. At least theoretically, using this kind of technique the use of material may be optimized. Blanks of different thickness may be joined or a steel blank may be joined with a coated steel blank for example, using the specific properties of each material where they are needed.

These blanks may be welded "edge to edge" ("butt-joining"). These so-called tailored blanks, are designed to be hot stamped and afterwards be manufactured to form automotive parts. Tailored welded blanks may be used for structural components such as doors, B-Pillars, beams, floor, etc.

Similarly "patchwork" blanks are known, in which several blanks are not necessarily welded "edge-to-edge", but instead partial or complete overlaps of blanks may be used.

An example of steel used in the automotive industry is 22MnB5 steel. In order to avoid the decarburization and the scale formation during the forming process, 22MnB5 is presented with an aluminum-silicon coating. Usibor® 1500P and Ductibor® 500P, commercially available from Arcelor Mittal, are examples of steels used in tailored and patchwork blanks.

Patchwork blanks and tailored blanks may also be used or useful in other industries.

Usibor® 1500P is supplied in ferritic-perlitic phase. It is a fine grain structure distributed in a homogenous pattern. The mechanical properties are related to this structure. After heating, a hot stamping process, and subsequent quenching, a martensite microstructure is created. As a result, maximal strength and yield strength increase noticeably.

The composition of Usibor is summarized below in weight percentages (rest is iron (Fe) and unavoidable impurities):

| C | Si | Mn | P | S | Cr | Ti | B | N |
|------|------|------|-------|-------|------|-------|-------|-------|
| 0.24 | 0.27 | 1.14 | 0.015 | 0.001 | 0.17 | 0.036 | 0.003 | 0.004 |

As mentioned before, Usibor 1500 is supplied with an aluminum-silicon (AlSi) coating in order to prevent corrosion and oxidation damage. However, this coating has a significant downside related to its weld behavior. If Usibor blanks are welded without any further measures, aluminum of the coating may enter into the weld area and this can cause an important reduction of the mechanical properties of the resulting component and increase the possibility of weak fracture in the weld zone.

In order to overcome this problem a method was proposed in DE202007018832 U1 which consists in removing (e.g. by laser ablation) a part of the coating in an area close to the welding gap. This method has the disadvantage that an additional step is needed for the production of the (tailored) blanks and components and that in spite of the repetitive nature of the process this additional step requires a complex quality process with an elevated number of parts which are to be scrapped. This entails an increase of the cost of the welding step and limits the competitiveness of the technology in the industry.

WO 2013/045497 discloses a method for butt welding coated sheet metals, wherein at least one powder welding additive in the form of a gas-powder flow is fed to the welding melt with a speed of 2 m/s-50 m/s. A relatively high speed is needed in order to achieve mixing of the powder additive in the weld zone.

The problems of poor weldability due to aluminum entering in the weld zone are not only known from welding plates or blanks of coated steels, but may also be found e.g. when welding two aluminum blanks or when welding a steel blank (with or without coating) with an aluminum blank.

Herein a blank may be regarded as an article which has yet to undergo one or more processing steps (e.g. deformation, machining, surface treatment or other). These articles may be substantially flat plates or have more complicated shapes.

In examples of the welding methods described herein the aforementioned disadvantages are avoided or at least partially reduced.

SUMMARY

In a first aspect, the present disclosure provides a method for joining a first blank and a second blank, wherein at least one of the first and second blanks comprises at least a layer of aluminum or of an aluminum alloy. The method comprises selecting a first portion of the first blank to be joined to the second blank, and selecting a second portion of the second blank to be joined to the first portion; twin spot welding the first portion to the second portion, while supplying a metal powder to a weld zone. The first portion and the second portion of the blanks and the metal powder in the weld zone are melted during welding and the metal powder is mixed with the melted first and second portions. The metal powder is an iron based powder comprising gammagenic elements.

According to this aspect, aluminum may be present in the weld zone, but it does not lead to worse mechanical properties after hot deformation processes such as hot stamping. Since an iron based powder which comprises gammagenic elements is introduced in the weld zone and mixed with the melted aluminum, austenite (gamma phase iron, γ-Fe) may be obtained by heating. During quenching after a hot deformation, a martensite microstructure which gives satisfactory mechanical characteristics may thus be obtained.

In twin spot welding, melting and welding take place simultaneously in two focal points. The two spots may be aligned parallel (parallel twin beam spots), or perpendicular (perpendicular twin beam spots) to, the direction of welding. Perpendicular twin spots bring a wider melting pool and at least in theory could produce a convection weld instead of a keyhole due to a wider heated area. Parallel twin spots (one behind the other) convey a lower thermal gradient during welding.

Without being bound to any theory, inventors believe that n twin spot welding, the Marangoni effect in the weld zone and mixture of the powder in the weld zone may be improved due to "vortices" created in the weld zone.

In examples employing twin spot welding, the laser power may be equally or unequally divided between the two weld spots.

There is thus no need to remove an aluminum or aluminum alloy layer, such as was proposed in some prior art methods. When e.g. coated steel blanks are to be welded, this may be done quicker and cheaper since an intermediate process step is not necessary anymore.

Gammagenic elements are herein to be understood as chemical elements promoting the gamma-phase, i.e. the austenite phase. The gammagenic elements may be selected from a group comprising Nickel (Ni), Carbon (C), Cobalt (Co), Manganese (Mn) and Nitrogen (N). Other factors may also be taken into account for the composition of the metal powder, such as e.g. promoting hardness (Molybdenum (Mo) would be a suitable element) and/or corrosion resistance (in which case, Silicon (Si) and Chromium (Cr) would be suitable components).

Aluminum alloys are herein to be understood as metal alloys in which aluminum is the predominant element.

Preferably, the amount of gammagenic elements in the powder is sufficient to compensate for the presence of alphagenic elements such as Cr, Mo, Si, Al and Ti (Titanium). Alphagenic elements promote the formation of alpha-iron (ferrite). This may lead to reduced mechanical properties as the microstructure resulting after hot stamping and quenching may comprise martensite-bainite in matrix and delta-ferrite.

In some embodiments, a grain size of the powder is between 20 microns and 180 microns, and optionally between 20 and 125 microns may be used. Optionally, an average grain size of the powder is between 45 and 90 microns, or between 50 and 80 microns. Inventors have found that these grain sizes may lead to enhanced penetration and mixture of the powder in the weld zone. Sufficient mixture throughout the complete weld zone enhances the mechanical properties of the final product.

In some embodiments, the iron based powder may have a composition in weight percentages of 0%-0.03% carbon, 2.0-3.0% of molybdenum, 10%-14% of nickel, 1.0-2.0% of manganese, 16-18% chromium, 0.0-1.0% of silicon, and the rest iron and unavoidable impurities. Inventors have found that a powder of this mixture leads to very satisfactory mechanical properties and corrosion resistance of the final work product, i.e. after hot stamping and quenching.

In some embodiments, welding may comprise welding using a laser with a power of between 3 kW and 16 kW, optionally between 4 and 10 kW. The power of the laser should be enough to melt the first and second portions of the blanks. Preferably, the first and second portions of the blanks are melted along the entire thickness of the blanks such that the powder may be present throughout the entire thickness as well.

The resulting microstructure of the final work product may thus be improved.

The inventors have found that 3 kW-5 kW is sufficient for melting typical blanks (typical thickness range of 0.7-4 mm). Increasing the power of the welder towards the upper part of the range permits increasing the welding velocity.

Optionally, a Nd-YAG (Neodymium-doped yttrium aluminum garnet) laser may be used. These lasers are commercially available, and constitute a proven technology. This type of laser may also have sufficient power to melt the portions of the blanks and allows varying the width of the focal point of the laser and thus of the weld zone. Reducing the size of the "spot" increases the energy density, whereas increasing the size of the spot enables speeding up the welding process. The weld spot may be very effectively controlled and various types of welding including twin spot welding and waiving spot welding are possible with this type of laser. In some examples, helium or a helium based gas may be used as a shielding gas. Alternatively an argon based gas may be used. The flow rate of the shielding gas may e.g. be varied from 1 liter/min to 15 liters/min.

In alternative examples, a $CO_2$ laser with sufficient power may be used.

In some embodiments, supplying the metal powder to the weld zone may comprise feeding a gas-powder flow to the weld zone. Nitrogen may be used as a transportation gas, depending on the specific implementation. In alternative embodiments, the metal powder has previously been deposited along the first and second portion of the blanks.

In some embodiments, feeding the gas-powder flow may include feeding the gas-powder flow at an angle between 15° and 60° with respect to the first portion, optionally between approximately 30° and approximately 45°. The inventors have found that supplying a powder with a lateral nozzle at such angles promotes the mixture of the powder. In other examples, coaxial feeding of the power (coaxial with the laser) may be used. The gas-powder flow may be fed towards the weld zone from the front or from the back of the weld zone (as seen in the weld direction).

The various methods hereinbefore described may be used for forming e.g. tailored blanks, by butt joining two blanks. One of the blanks or both blanks may comprise a steel substrate with a coating comprising a layer of aluminum or an aluminum alloy. In particular an AlSi coating may be used. Examples include the use of Usibor or Ductibor blanks. In other examples, the first blank and/or the second blank may be made of aluminum or an aluminum alloy.

In a second aspect, the present disclosure provides a method for forming a product comprising forming a blank including a method of joining a first and a second blank in accordance with any of the hereinbefore described methods and subsequently heating the blank, and hot deforming of the heated blank and final quenching. Heating may include heat treatment in a furnace prior to deformation. Hot deforming may include e.g. hot stamping or deep drawing.

Additional objects, advantages and features of embodiments of the invention will become apparent to those skilled in the art upon examination of the description, or may be learned by practice of the invention.

BRIEF DESCRIPTION OF THE DRAWINGS

Particular embodiments of the present invention will be described in the following by way of non-limiting examples, with reference to the appended drawings, in which:

FIGS. 2a-2d schematically illustrate various arrangements for twin spot welding in combination with feeding a powder to the weld zone;

DETAILED DESCRIPTION

Figure 1A:
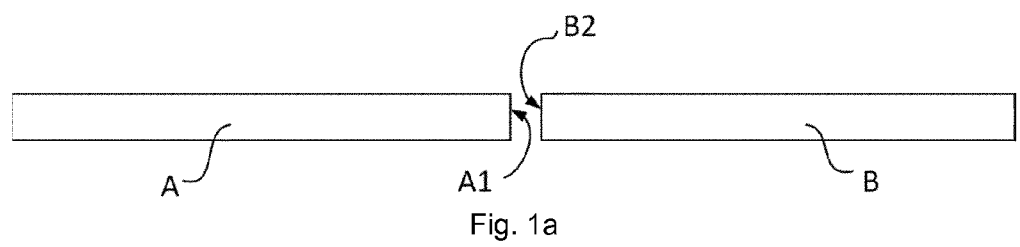
FIGS. 1a and 1b schematically illustrate a first example of joining two blanks.
Figure 1B:
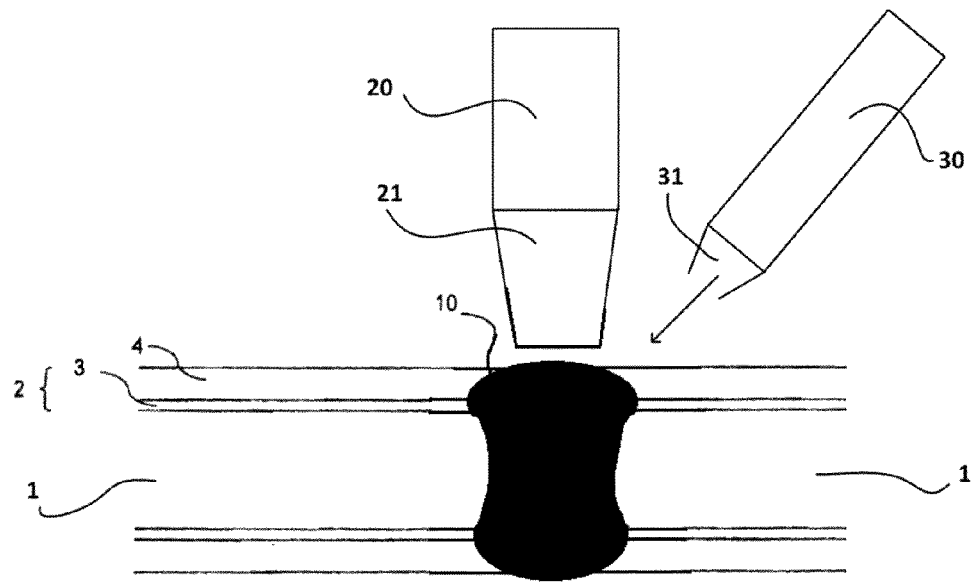

FIGS. 1a and 1b schematically illustrate a first example of a method of joining a first blank A with a second blank B. A first portion or region A1 of the first blank is to be joined to a second portion or region B2 of the second blank. In this example, the two blanks are to be butt-jointed, i.e. an edge-to-edge welding.

In this example, both blanks A and B may be of coated steel, such as e.g. Usibor 1500P®. Both blanks comprise a steel substrate 1 upon which a coating 2 is provided. The coating applied is aluminum-silicon (Al87Si10Fe3). Due to the process of application of the coating, the resulting coating has a metal alloy layer 4 and an intermetallic layer 3.

FIG. 1b further illustrates the method of joining. Schematically illustrated is a laser welder 20 having a laser head 21 from which the laser beam exits. Also schematically illustrated is a powder supply 30 with a nozzle 31. A gas-powder flow may exit the nozzle 31 as schematically illustrated by an arrow.

The gas-powder flow may thus be fed to the weld zone 10. The power of the laser may be sufficient to substantially melt both blanks along their entire thickness. The powder is supplied to the melt and thus may be thoroughly mixed throughout the entire weld zone 10.

For reasons of simplicity, only a single spot (instead of a twin spot) is shown in FIG. 1.

It may be seen that in this case, there is no need for removing the coating 2 of the steel substrate prior to welding, thus simplifying and speeding up manufacture. This may bring about a substantial cost reduction. At the same time, a powder of suitable composition comprising iron and sufficient gammagenic elements may ensure that good mechanical properties are obtained after the standard heat treatment for Usibor and after hot deformation processes such as hot stamping. Mixing of the powder in the weld zone is enhanced by using twin spot welding.

A standard treatment for Usibor blanks would be to heat the obtained blank in e.g. a furnace to bring about (among others) austenizing of the base steel. Then the blank may be hot stamped to form e.g. a bumper beam or a pillar. During quenching after a hot deformation, a martensite microstructure which gives satisfactory mechanical characteristics may thus be obtained. The standard treatment is not affected in any manner by the methods of joining proposed herein. In particular thanks to the gammagenic elements of the powder that are supplied with iron into the weld zone, a martensite structure can also be obtained in the area of the weld, in spite of the presence of aluminum.

The gas-powder flow may be fed towards the weld zone at different angles with respect to the first and second blanks. Inventors have found that very good mixtures of powder in the weld zone may be obtained by using an angle of between approximately 30°-45°.

FIGS. 2a-2d schematically illustrate various arrangements for laser twin spot welding in combination with feeding a powder to the weld zone. In each of the figures, a first blank A is to be joined to a second blank B along a weld seam C. Reference sign 25 shows twin spots. In each of the figures the arrow indicates the welding direction. Reference sign 30 indicates a powder source.

FIG. 2a indicates a perpendicular twin spot (the spots are arranged next to each other along a line perpendicular to the weld seam). The powder may be fed "laterally", i.e. from next to the laser. The powder may be fed from directly next to the laser (such as shown in FIG. 2d), or from the back of the laser (according to the welding direction) as in FIG. 2a and FIG. 2c. The powder may also be fed from the front of the laser as in FIGS. 2b and 2d.

FIG. 2b illustrates parallel twin spot welding, i.e. the spots are arranged along a line that is parallel to the weld seam. FIG. 2d illustrates that in some examples, more than one powder source 30, 33 may be used for feeding the powder towards the weld zone.

An aspect of parallel twin spot welding is that the thermal gradient to which the material is subjected is less. An aspect of perpendicular twin spot welding is that the weld zone is enlarged and thus enables mixing of the powder more easily. Inventors have tested both these arrangements and have found that both can work in a satisfactory manner.

Figure 3:
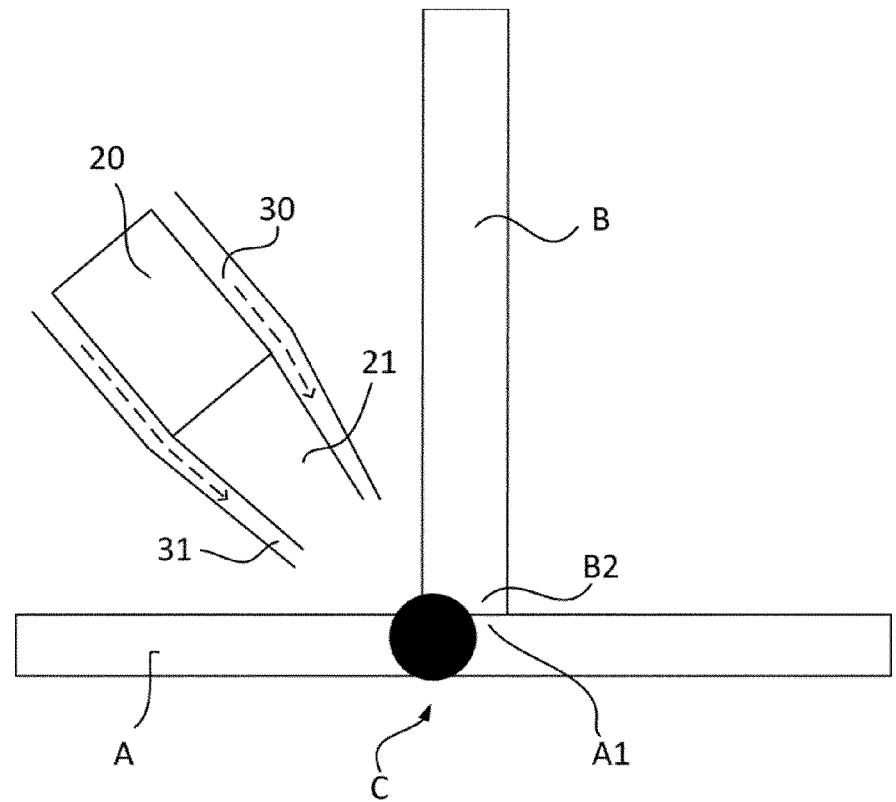
FIG. 3 schematically illustrates a further example of joining two blanks.

FIG. 3 schematically illustrates a further example of joining two blanks. A first portion A1 of blank A is to be joined in a substantially perpendicular manner to a portion B2 of blank B. A weld may be performed from the left hand side of blank B (as illustrated in FIG. 3) and/or from the right hand side of blank B.

A welding apparatus 20, e.g. a ND:YAG laser with sufficient power to melt the first and second portions of the blanks may be used. In this example, a gas-powder flow (indicated with an interrupted line with arrow) may be fed in a coaxial manner (with respect to the weld beam) towards the weld zone C.

For reasons of simplicity, only a single spot (instead of a twin spot) is shown in FIG. 3.

Figure 4:
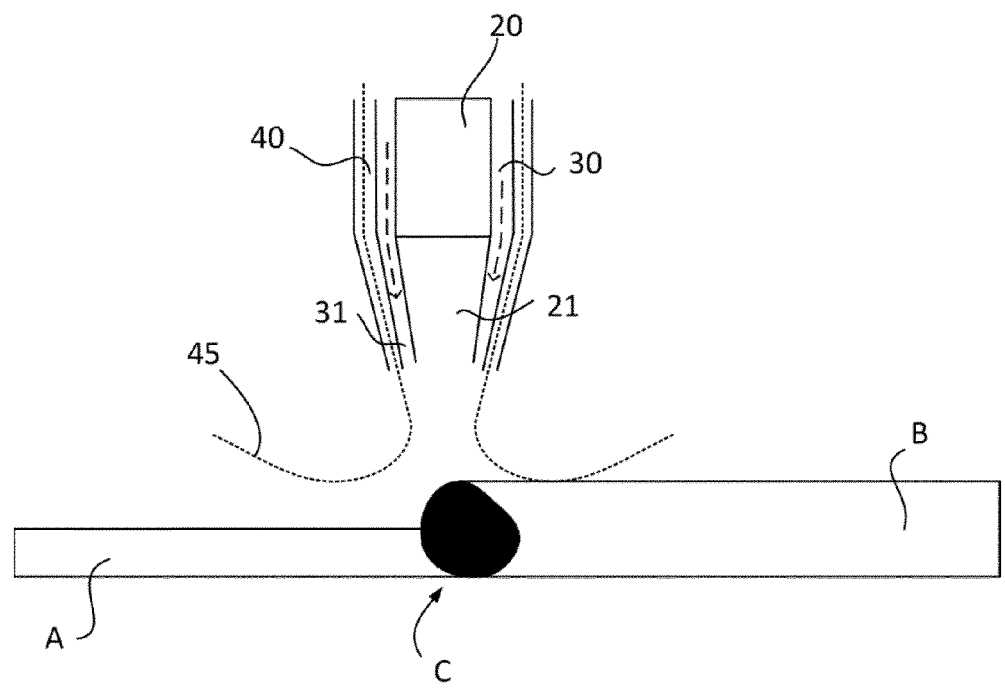
FIG. 4 schematically illustrates yet a further example of joining two blanks.

FIG. 4 schematically illustrates yet a further example of joining two blanks. In this example blanks A and B of different thicknesses are butt-jointed along a weld seam C. Also in this example, a coaxial arrangement of welding machine 20 and gas-powder flow from powder source 30 and nozzle 31 is used. Schematically illustrated is a shield gas flow 45 which is supplied around the weld zone from a coaxially (with respect to the welding beam) arranged shield gas channel 40.

For reasons of simplicity, only a single spot (instead of a twin spot) is shown in FIG. 4.

In all the examples illustrated herein so far, blanks in the shape of flat plates are joined together. It should be clear that examples of the methods herein disclosed may also be applied to blanks of different shapes.

After initial testing for proof-of-concept of melting the blanks and mixing through an iron-based powder with gammagenic elements, extensive testing was performed by the inventors to optimize with respect to feeding of a gas-powder flow (coaxially or laterally), twin spot (parallel, perpendicular, front of laser, back of laser), shielding gas (yes or no), velocity of powder flow, velocity of the laser and position of the laser.

In these tests, a first flat Usibor plate of 1.3 mm thickness was butt-jointed with a second flat Usibor plate of 1.7 mm thickness. For these tests, an ND:YAG laser was used with a power of 3.5 kW. Twin spot welding was selected because it was expected to perform better than single spot welding because of enhanced mixing of powder throughout the weld zone. Both spots received 50% of the total laser power.

The powder fed to the weld zone was AlSi316L, as commercially available from e.g. Hoganäs. The powder has the following composition in weight percentages: 0%-0.03% carbon, 2.0-3.0% of molybdenum, 10%-14% of nickel, 1.0-2.0% of manganese, 16-18% chromium, 0.0-1.0% of silicon, and the rest iron and unavoidable impurities. A predominant grain size of 45-90 microns was used. It was found that this composition led to good mechanical properties (e.g. hardness, tensile strength) after heating, hot deformation and quenching. It was also found that good corrosion resistance was obtained using such a powder.

The addition of chromium and silicon aids in corrosion resistance, and molybdenum aids in increasing the hardness. The gammagenic elements present in the powder are nickel, carbon and manganese.

After welding, the resulting blanks underwent a "normal treatment", including hot deformation and quenching. After this, a test specimen for a standard tensile strength test was cut from the resulting product. The parameters measured included Ultimate Tensile Strength (UTS) in MPa, Yield Strength in MPa, Elongation at break in %, the Vickers hardness and furthermore the microstructure of the weld area was inspected using spectrometry equipment.

These results could be compared with unwelded Usibor products that have undergone the same treatment, i.e. the same thermal cycle including hot deformation and quenching. This comparison is significant since it can indicate whether the weld is significantly weaker than the standard unwelded material or not.

In the case of Usibor 1500® used in the different tests, the following standard values apply: Ultimate Tensile strength between 1.300 and 1.650 MPa, Yield Strength (0.2%) between 950 and 1.250 MPa, Elongation at break A50 5%, Vickers Hardness HV 10 between 400 and 520.

In the case of the Ultimate tensile strength and Yield Strength, a good performance is regarded as a UTS in the ranges of an unwelded Usibor product.

Finally, the point of rupture in the tensile strength testing is taken into account. Several results were obtained in which the point of rupture was not in the welding area or the heat affected zone (HAZ). This means that the weld area in these tests resulted to be equivalent or stronger than the base material.

In many tests, Ultimate Tensile Strengths between 1.300 and 1.600 MPa were found. Also elongation at break of above 5% was found in many of the tests. Also the Vickers Hardness HV10 in the area of the weld generally was in the range of 400 to 520.

The inventors found that in particular the lateral feed of the gas-powder flow leads to good results, although some samples in which a coaxial arrangement was used also performed well. At the same time, it was shown that both front side feeding and back side feeding of the powder flow can lead to good results. Also, good performance is obtained both for parallel twin spots and perpendicular twin spots. It was found that the presence or absence of a shielding gas did not have a significant effect on the obtained results. And the distance to the weld surface and displacement with respect to the blank edges (due to the fact of having blanks of different thicknesses) preferably should be optimized in conjunction with the other parameters as they both influence the results.

Figure 5:
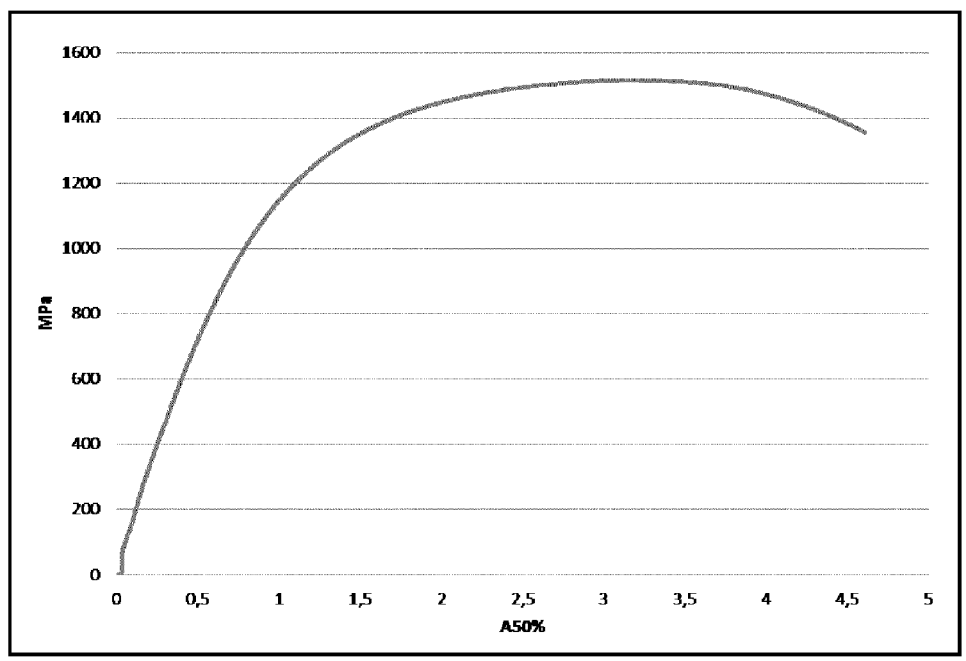
FIG. 5 shows a stress-strain curve of a test specimen prepared using a method of joining herein described.

FIG. 5 illustrates a stress-strain curve as obtained in one sample using perpendicular twin spot welding and back side feeding of the powder. It may be seen that an UTS of approximately 1.500 MPa was reached.

Although only a number of particular embodiments and examples of the invention have been disclosed herein, it will be understood by those skilled in the art that other alternative embodiments and/or uses of the invention and obvious modifications and equivalents thereof are possible. Furthermore, the present invention covers all possible combinations of the particular embodiments described. Thus, the scope of the present invention should not be limited by particular embodiments, but should be determined only by a fair reading of the claims that follow.

The invention claimed is:

1. A method for joining a first blank and a second blank, the method comprising:
    selecting a first portion of the first blank to be joined to the second blank, and selecting a second portion of the second blank to be joined to the first portion,
    welding the first portion to the second portion with twin spot welding, while supplying a metal powder to a weld zone, wherein
    the first and the second blank comprise a 22MnB5 steel substrate with a coating having a layer of aluminum or of an aluminum alloy,
    the first portion and the second portion of the blanks and the metal powder in the weld zone are melted during welding and the metal powder is mixed with the melted first and second portions, and
    the metal powder is an iron based powder comprising gammagenic elements.

2. The method according to claim 1, wherein the twin spot welding comprises perpendicular twin spot welding.

3. The method according to claim 1, wherein the twin spot welding comprises parallel twin spot welding.

4. The method according to claim 1, wherein a grain size of the powder is between 20 microns and 180 microns.

5. The method according to claim 4, wherein an average grain size of the powder is between 50 and 80 microns.

6. The method according to claim 1, wherein the iron based powder has a composition in weight percentages of 0%-0.03% carbon, 2.0-3.0% of molybdenum, 10%-14% of nickel, 1.0-2.0% of manganese, 16-18% chromium, 0.0-1.0% of silicon, and the rest iron and unavoidable impurities.

7. The method according to claim 1, wherein the welding comprises welding using a laser with a power of between 3 kW and 16 kW.

8. The method according to claim 7, wherein the welding comprises welding with an Nd:YAG laser.

9. The method according to claim 1, wherein supplying the metal powder to the weld zone comprises feeding a gas-powder flow to the weld zone.

10. The method according to claim 9, wherein feeding the gas-powder flow includes feeding the gas-powder flow at an angle between 15° and 60° with respect to the first portion.

11. The method according to claim 1, wherein the first and second blanks are butt-jointed, the first portion being an edge of the first blank and the second portion being an edge of the second blank.

12. A method for forming a product comprising
    forming a blank including a method of joining a first and a second blank according to the method of claim 1,
    heating the blank, and
    hot deforming and subsequent quenching of the heated blank.

* * * * *